United States Patent
Kaippallimalil et al.

(10) Patent No.: US 9,942,909 B2
(45) Date of Patent: Apr. 10, 2018

(54) SYSTEM AND METHOD FOR CONNECTION REHOMING

(71) Applicant: Futurewei Technologies, Inc., Plano, TX (US)

(72) Inventors: John Matthew Kaippallimalil, Richardson, TX (US); Peter J. McCann, Bridgewater, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 14/630,233

(22) Filed: Feb. 24, 2015

(65) Prior Publication Data

US 2015/0249999 A1    Sep. 3, 2015

Related U.S. Application Data

(60) Provisional application No. 61/946,418, filed on Feb. 28, 2014.

(51) Int. Cl.
*H04W 4/00* (2009.01)
*H04W 72/08* (2009.01)
(Continued)

(52) U.S. Cl.
CPC ......... *H04W 72/085* (2013.01); *H04W 24/08* (2013.01); *H04W 36/08* (2013.01); *H04W 36/12* (2013.01); *H04W 36/24* (2013.01); *H04L 61/2007* (2013.01); *H04L 61/6068* (2013.01); *H04W 8/087* (2013.01); *H04W 36/0011* (2013.01); *H04W 40/36* (2013.01); *H04W 48/17* (2013.01)

(58) Field of Classification Search
CPC .. H04W 36/0016; H04W 48/20; H04W 36/14
See application file for complete search history.

(56) References Cited

U.S. PATENT DOCUMENTS 8,432,871 B1  4/2013 Sarnaik et al.
9,253,703 B1*  2/2016 Oroskar ............... H04W 36/30
(Continued)

FOREIGN PATENT DOCUMENTS

WO     2014/019629 A1    2/2014
WO  WO 2014019629 A1 *  2/2014  ............ H04W 48/17

OTHER PUBLICATIONS

3GPP (study on co-ordinated PGW change for selected IP traffic offload (CSIPTO), release 13, V1.0.0, Feb. 2014).*
(Continued)

*Primary Examiner* — Maharishi Khirodhar
(74) *Attorney, Agent, or Firm* — FutureWei Technologies, Inc.

(57) ABSTRACT

A method for connection rehoming by a user equipment includes attaching to a first network attachment point (AP) and establishing a first connection to a first packet data network (PDN) interface, and moving from the first network AP to a second network AP. The method includes discovering a first cost associated with the first connection is high, and rehoming the first connection, thereby establishing a second connection coupling the UE to a second network AP and to a second PDN interface, wherein a second cost associated with the second connection is low.

15 Claims, 10 Drawing Sheets

(51) Int. Cl.

| | | |
|---|---|---|
| *H04W 24/08* | (2009.01) | |
| *H04W 36/08* | (2009.01) | |
| *H04W 36/24* | (2009.01) | |
| *H04W 36/12* | (2009.01) | |
| H04W 36/00 | (2009.01) | |
| H04L 29/12 | (2006.01) | |
| H04W 8/08 | (2009.01) | |
| H04W 40/36 | (2009.01) | |
| H04W 48/00 | (2009.01) | |

(56) References Cited

U.S. PATENT DOCUMENTS

| | | | | |
|---|---|---|---|---|
| 9,363,846 | B2* | 6/2016 | Trang | H04W 76/045 |
| 2004/0030791 | A1* | 2/2004 | Dorenbosch | H04W 36/0033 |
| | | | | 709/230 |
| 2005/0190782 | A1* | 9/2005 | Buckley | H04W 36/12 |
| | | | | 370/437 |
| 2008/0089293 | A1* | 4/2008 | Madour | H04W 36/0016 |
| | | | | 370/331 |
| 2009/0080382 | A1* | 3/2009 | Chen | H04W 36/0016 |
| | | | | 370/331 |
| 2009/0219832 | A1* | 9/2009 | Velev | H04W 36/0011 |
| | | | | 370/254 |
| 2010/0254279 | A1* | 10/2010 | Choi | H04L 43/0882 |
| | | | | 370/252 |
| 2011/0080853 | A1* | 4/2011 | Thubert | H04L 45/02 |
| | | | | 370/255 |
| 2013/0230021 | A1 | 9/2013 | Zuniga et al. | |
| 2013/0303170 | A1* | 11/2013 | Siomina | G01S 5/0205 |
| | | | | 455/436 |
| 2015/0024703 | A1* | 1/2015 | Lindholm | H04W 36/0022 |
| | | | | 455/404.1 |

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP TS 23.401 V12.7.0, Dec. 2014, 308 pages.

3rd Generation Partnership Project; Technical Specification Group Services and System Aspects; Architecture enhancements for non-3GPP accesses (Release 12), 3GPP TS 23.402 V12.7.0, Dec. 2014, 290 pages.

3GPP TR 22.828 v1.0.0, 3rd Generation Partnership Project; Technical Specification Group SA, Study on Co-ordinated PGW change for Selected IP Traffic Offload (CSIPTO) (Release 13), Feb. 2014, total 18 pages.

SGPP TSG SA WG2 Meeting #77, TD S2-10xxxx (S2-100408), SA WG2 Temporary Document, "Load Re-balancing between GWs", Hitachi, KDDI?, Jan. 18-22, 2010, Shenzhen, China, total 4 pages.

\* cited by examiner

SYSTEM AND METHOD FOR CONNECTION REHOMING

This application claims the benefit of U.S. Provisional Application No. 61/946,418, filed on Feb. 28, 2014, entitled "System and Method for Packet Data Network Connection Rehoming," which application is hereby incorporated herein by reference.

TECHNICAL FIELD

The present disclosure relates generally to digital communications, and more particularly to a system and method for connection rehoming in communications networks.

BACKGROUND

Denser radio networks, localized patterns of mobility, virtualization and other technological/business drivers are causing the 3GPP evolved packet core (EPC) to become more distributed. Distributed gateways (internet protocol (IP) anchor points) of such EPC networks are much closer to the user. As a user moves from one radio access network (RAN) node/evolved Node B (eNB) to the next, it is likely that the point of initial attachment (initial packet data network gateway (PGW)) is not the best or closest.

SUMMARY OF THE DISCLOSURE

Example embodiments of the present disclosure which provide a system and method for connection rehoming in communications networks.

In accordance with an example embodiment of the present disclosure, a method for connection rehoming is provided. The method includes attaching, by a user equipment (UE), to a first network attachment point (AP) and establishing a first connection to a first packet data network (PDN) interface, and moving, by the UE, from the first network AP to a second network AP. The method includes discovering, by the UE, a first cost associated with the first connection is high, and rehoming, by the UE, the first connection, thereby establishing a second connection coupling the UE to a second network AP and to a second PDN interface, wherein a second cost associated with the second connection is low.

In accordance with another example embodiment of the present disclosure, a method for connection rehoming is provided. The method includes receiving, by a network entity, a first control message from a user equipment (UE) initiating a rehoming for a first connection coupling the UE to a first network AP and to a first packet data network (PDN) interface, wherein a first cost associated with the first connection is high, and sending, by the network entity, a second control message to the UE, the second control message completing the rehoming of the first connection.

In accordance with another example embodiment of the present disclosure, a user equipment (UE) adapted to perform connection rehoming is provided. The UE includes a processor, and a computer readable storage medium storing programming for execution by the processor. The programming including instructions to attach to a first network attachment point (AP) and establish a first connection to a first packet data network (PDN) interface, move from the first network AP to a second network AP, discover a first cost associated with the first connection is high, and rehome the first connection, thereby establishing a second connection coupling the UE to a second network AP and to a second PDN interface, wherein a second cost associated with the second connection is low.

One advantage of an embodiment is that rehoming leads to the replacement of high cost (overhead, resources, and the like) connections with low cost connections, thereby reducing communications costs.

A further advantage of an embodiment is that the user equipments initiate the rehoming since the user equipments have knowledge of the communications needs of applications that they are executing.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to connection rehoming in communications networks. For example, a user equipment (UE) attaches to a first network attachment point (AP) and establishing a first connection to a first packet data network (PDN) interface, and moves from the first network AP to a second network AP. The UE discovers a first cost associated with the first connection is high, and rehomes the first connection, thereby establishing a second connection coupling the UE to a second network AP and to a second PDN interface, wherein a second cost associated with the second connection is low.

The present disclosure will be described with respect to example embodiments in a specific context, namely communications systems that support user equipment (UE) mobility and UE initiated rehoming. The disclosure may be applied to standards compliant communications systems, such as those that are compliant with Third Generation Partnership Project (3GPP), IEEE 802.11, IETF, and the like, technical standards, and non-standards compliant communications systems, that support UE mobility and UE initiated rehoming.

Figure 1:
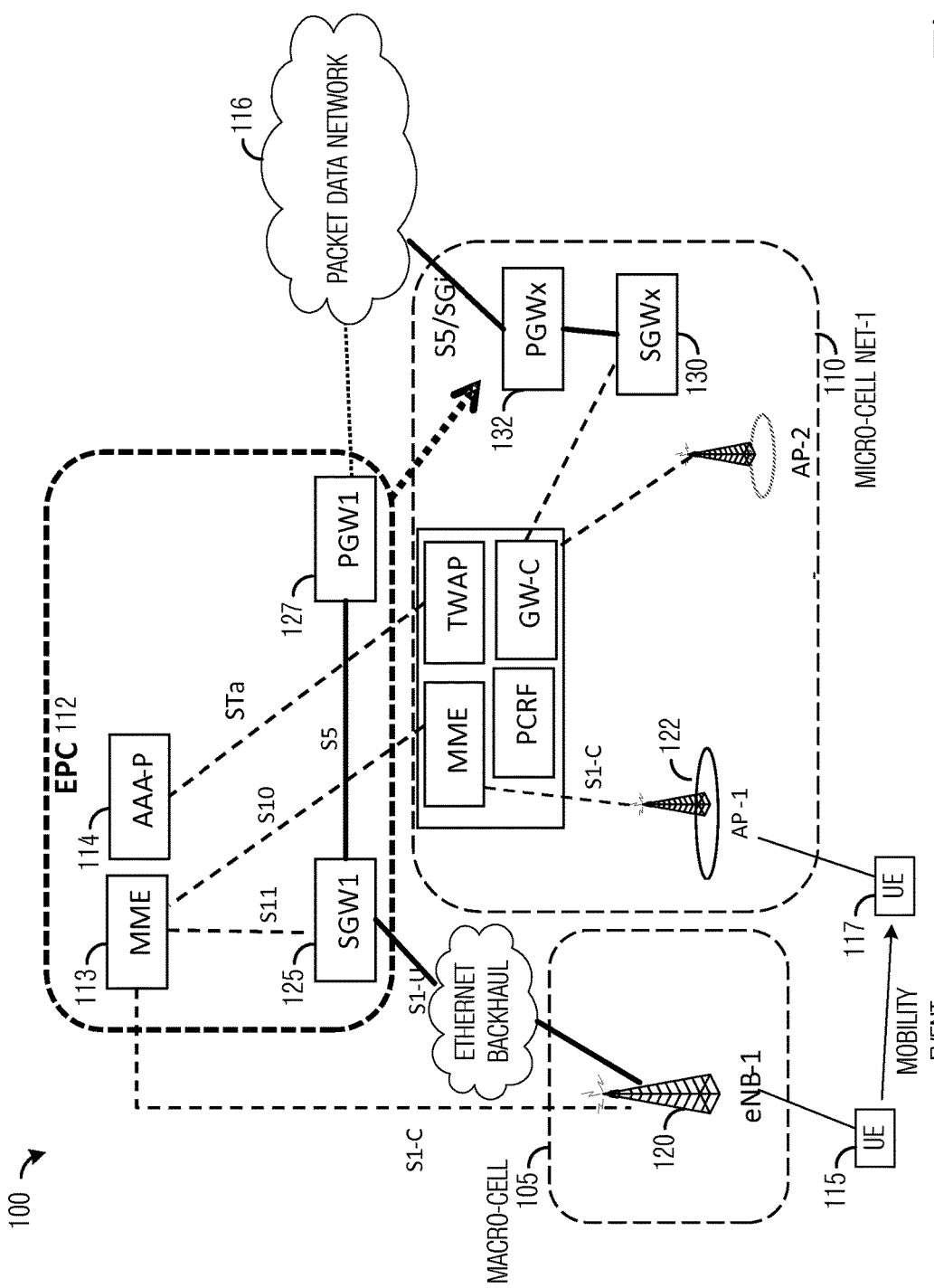
FIG. 1 illustrates an example communications system according to example embodiments described herein.

FIG. 1 illustrates an example communications system 100. Communications system 100 includes an Evolved Packet Core (EPC) 112, a macro EPC 105 (shown in FIG. 1 as "MACRO-CELL"), and a micro EPC 110 (shown in FIG. 1 as "MICRO-CELL NET-1"). Macro EPC 105 and micro EPC 110 may be components of EPC 112. EPC 112 may also include a mobility management entity (MME) 113 and an authentication authorization accounting proxy (AAA-P) 114. MME 113 may handle signaling related to mobility and security for network access, while AAA-P 114 may provide authentication, authorization, and/or accounting services for communications system 100. EPC 112 may be a stand-alone network or may be coupled to another packet data network (PDN) 116. A UE may move between radio nodes and/or cells in the networks. As an illustrative example, UE 115 that is attached to evolved Node B (eNB) 120 of macro EPC 105 may move to a coverage area served by access point (AP) ("AP-1") 122, where it is shown as UE 117 to avoid confusion. AP 122 may be an eNB, a micro cell, a femto cell, a pico cell, or a low power node (LPN). Macro EPC 105 is depicted as an eNB, but could be any manner of AP, including a cell, a micro cell, a femto cell, a pico cell, or a LPN.

When UE 115 is connected to eNB 120 of the macro EPC 105, packet data network (PDN) connections of UE 115 are established to a serving gateway (SGW) 125 (shown as SGW1 of the EPC 112) and a packet data network gateway (PGW) 127 (shown as PGW1). The term PGW1 127 is used herein, although it should be understood that the PGW1 127 element can comprise any PDN interface. As UE 115 moves from the macro EPC 105 to AP-1 122 of the micro EPC 110, UE 117 (formerly UE 115) may establish an S1 connection to SGWx 130 while maintaining an S5 connection to PGW1 127. The establishment of the S1 and S5 connections may help to ensure that the Internet Protocol (IP) session is not suddenly lost. Communications system 100 may be able to signal (to the UEs) that the IP attachment is not optimal and have the UEs set up PDN connections to a more optimal PDN interface, such as PGWx 132 in this situation. The term PGWx 132 is used herein, although it should be understood that the PGWx 132 element can comprise any PDN interface. Typically, a PDN interface may be any of a SGW, a PGW, a router, a gateway, and the like.

While it is understood that communications systems may employ multiple eNBs/nodes capable of communicating with a number of UEs, only one eNB, two APs, a number of nodes, and a number of UEs are illustrated for simplicity.

The IP connections and PDN transfer capabilities are valuable for transmission control protocol (TCP) and/or user datagram protocol (UDP), even when new transports such as multipath TCP (MPTCP) are utilized. They provide UEs the ability to select a time at which it is optimal to transfer the connection, as well as packets in transit.

In Third Generation Partnership Project (3GPP) compliant networks, the SGW anchors the mobility of a UE between eNBs while the PGW serves as an anchor for the IP address. Mobility mechanisms in S1 and X2 interfaces address how the network can maintain the session during handover between different eNBs (and SGWs). On the other hand, IP session mobility is not addressed in current networks because the PGW is highly centralized and the IP address remains anchored as the user moves within the radio access networks.

In future mobile networks with highly distributed gateways, IP session mobility may become an issue. As a UE moves from one radio access network (RAN) eNB and/or node to the next, it is likely that the point of initial attachment (initial PGW) is not the best or closest. The UE may need to be notified of its distance from the first PGW. The distance between UE and first PGW may be quantified in terms of cost, for example. The cost may be characterized as overhead, network resources, and the like, dedicated to the connection(s) between the UE and the first PGW. The established PDN connections need to be moved so as not to adversely impact packets in transit during these events. An example embodiment addresses this by moving PDN connections to the closer IP access point (i.e., PGW).

Since 3GPP compliant networks use bearers and PDN connections, which are Layer 2 constructs, over which IP services are transported, example embodiments are also applicable to 3GPP PDN connection handling. Each UE may have multiple PDN connections. Current systems may need extensions to provide fully optimal selection of gateways or routers.

While future mobile and/or 3GPP compliant networks are expected to have much more distributed gateways, it may also be the case that transports (such as MPTCP) can alleviate the need for extensive IP layer mobility support. Example embodiments may also work with MPTCP to provide IP session continuity for a short duration, and to transfer the connection to a more optimally routed one. Therefore, example embodiments should be applicable regardless of the transport layer of the IP packet, e.g., UDP, TCP, MPTCP, and the like.

According to an example embodiment, mobility support is provided in networks in which IP gateways are distributed. In such a situation, a UE discovers the cost of connections to the PDN interfaces is high and determines to rehome the connections. The UE may discover the status of its IP attachments, and, if it is not optimally attached, it may be able to reattach to a better PDN interface (e.g., a PGW, a SGW, a router, a gateway, and the like). As a result of the high costs, the UE may trigger a setup to rehome the PDN connection(s). The UE may indicate to the network at an appropriate time (based on application status, transport, and the like) to transition to the new PDN interface. The UE may be able to trigger the tear down of old and/or suboptimal PDN connections and establish new PDN connections. The network may facilitate the change from the old PDN connections to the new PDN connections.

According to an example embodiment, 3GPP and IEEE 802.11 WiFi networks attached to the EPC are supported. Solutions for each of the cases are provided. A first solution temporarily relocates the IP address while the connection(s) is rehomed, while a second solution maintains a tunnel while the connection(s) is rehomed.

According to an example embodiment, the transition to a new PDN interface and/or connection occurs while a session is in progress, which becomes more valuable as gateways become distributed. The example embodiments may be implemented in PGWs, SGWs, mobility management entities (MMEs), trusted wireless access gateways (TWAGs), and other nodes of networks, such as 3GPP EPCs, and the like.

According to an example embodiment, networks, such as 3GPP EPCs, establish a new PDN connection following a mobility event between radio access clusters, retains an old IP prefix, advertises both the old IP prefix (presumably a high cost prefix) and a new IP prefix (typically a low cost prefix), and reclaims the high cost prefix after the UE switches to the low cost prefix.

According to an example embodiment, a MME indicates route distance (e.g., connection cost) and enables the rehoming of PDN connection(s).

According to an example embodiment, a 3GPP TWAG establishes a PDN connection following a mobility event between clusters, retains an old IP prefix, advertises both the old IP prefix (presumably a high cost prefix) and a new IP prefix (typically a low cost prefix) from a local IP prefix pool, and reclaims the high cost prefix after the UE switches to the low cost prefix. According to another example embodiment, the TWAG indicates the high cost prefix and rehomes the PDN connection and IP prefix to a low cost PDN interface when the UE indicates.

According to an example embodiment, the UE discovers high cost connections in router advertisements including a measure of cost associated with the connections, as well as MME indications.

Figure 2:
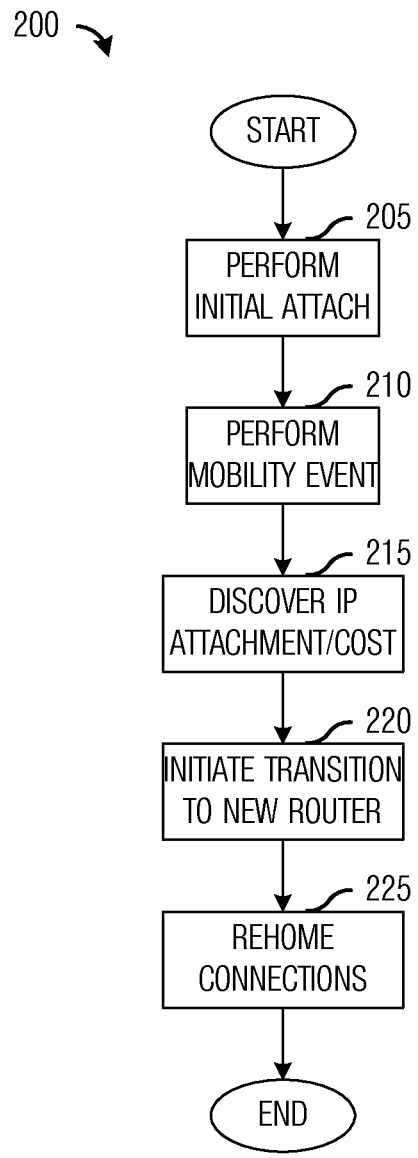
FIG. 2 illustrates flow diagram of example operations occurring in a UE as the UE participates in connection rehoming according to example embodiments described herein.

FIG. 2 illustrates a flow diagram of example operations 200 occurring in a UE as the UE participates in connection rehoming. Operations 200 may be indicative of operations occurring in a UE, such as UE 117, as the UE participates in connection rehoming.

Operations 200 may begin with the UE attaching to an initial EPC of a communications system (block 205). Part of the initial attach may include the assigning to PGW and SGW to serve the UE (referred to herein as initial PGW and SGW), setting up PDN connection(s), obtaining an IP prefix (through IP version 6 (IPv6) stateless autoconfiguration, dynamic host configuration protocol (DHCP), and the like), and the like. The UE may exchange packets with services over the PDN connection(s). The UE may also move about.

As the UE moves, it may participate in a mobility event (block 210). Examples of mobility events may include a handover, a detach-attach operation, and the like. A result of the mobility event may be a change in SGW and/or PGW serving the UE (referred to herein as new SGW and PGW). Along with the change in SGW and/or PGW, the UE may receive a new IP prefix. The change(s) may result in increased communications costs (or increased routing distance) for packets exchanged between the UE and the services to which it is connected.

The UE may discover IP attachment information from the communications system (block 215). The IP attachment information may include IP prefixes servable by the new SGW and PGW, as well as measures of cost for the servable IP prefixes. As discussed previously, the measures of cost for the servable IP prefixes may be reflective of the routing distances of, resources utilized by, latency incurred by, and the like, packets exchanged between the UE and the services to which it is connected.

Based on the IP attachment information, the UE may initiate a transition to a new PDN interface (block 220). The UE may evaluate the servable IP prefixes in accordance with the measures of cost, as well as application usage, application capability, and the like, to determine if it can transition to the new PDN interface. As an illustrative example, the UE determines which of the servable IP prefixes can be released. Additionally, the UE determines how to handle IP prefixes that it is to continue using, but are not servable by the new SGW and PGW.

The UE may rehome connections (block 225). The UE may rehome connections by replacing the IP prefixes released with replacement connections established through the new SGW and PGW. Furthermore, for those IP prefixes that are not servable by the new SGW and PGW but that are still used by the UE, the UE may establish mobile IP sessions to continue using those IP prefixes.

In many networks that support mobility, such as 3GPP compliant networks, bearers and PDN connections (Layer 2 constructs) are used. The bearers and PDN connections are used to transport IP services. Each UE may have multiple PDN connections. Current networks may need extensions to provide fully optimal selection of gateways and/or routers.

Figure 3:
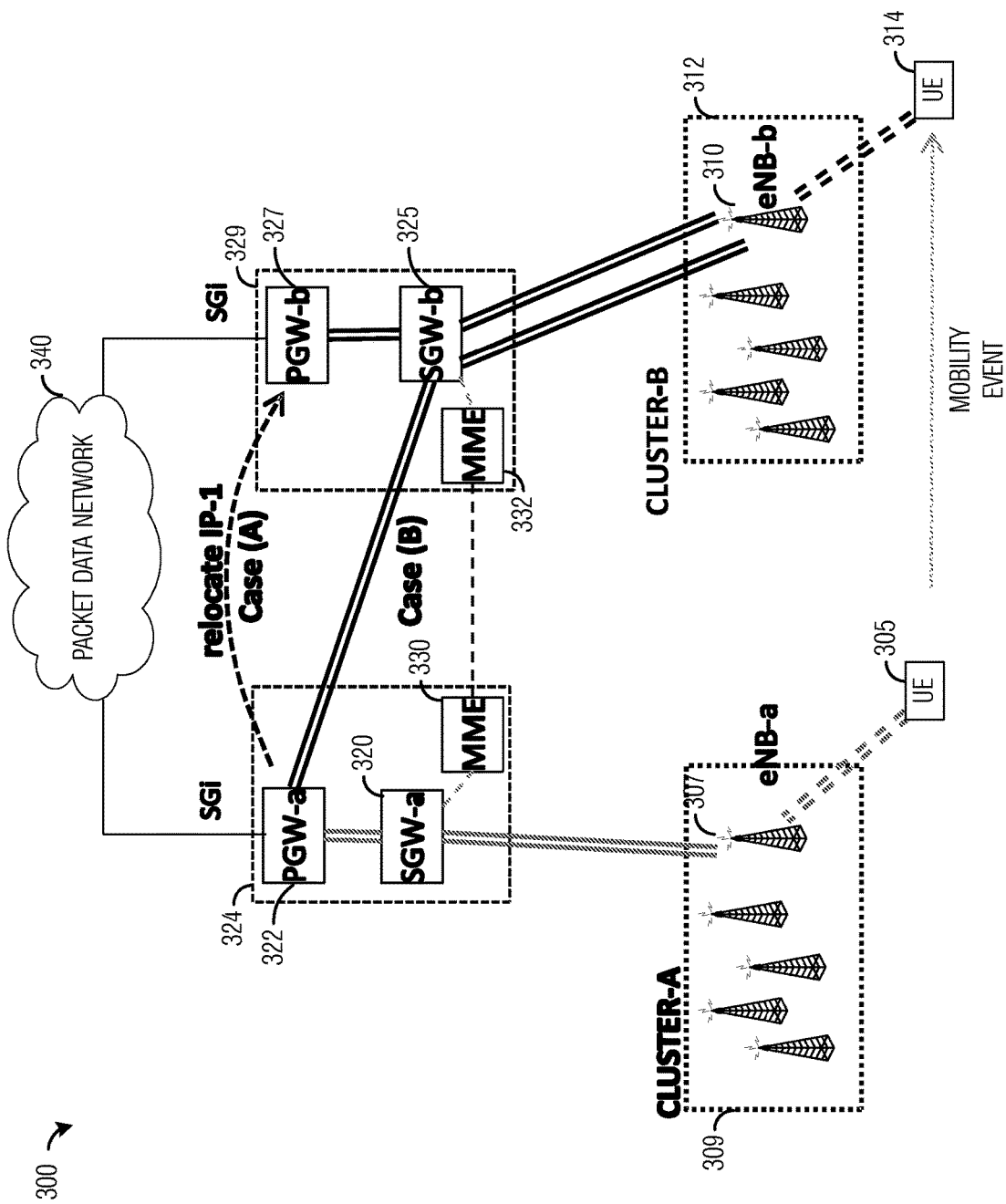
FIG. 3 illustrates an example communications system providing a high-level view of PDN connections and UE mobility according to example embodiments described herein.

FIG. 3 illustrates an example communications system 300 providing a high-level view of PDN connections and UE mobility. As shown in FIG. 3, a UE 305 is attached to an eNB 307 (eNB-a) of a cluster 309 (Cluster A). UE 305 is also connected to SGW 320 and PGW 322 of 3GPP EPC 324. The term PGW 322 is used herein, although it should be understood that the PGW 322 element can comprise any PDN interface. As UE 305 moves, it becomes attached to an eNB 310 (eNB-b) of a cluster 312 (Cluster B) after a mobility event. UE 305 is relabeled UE 314 to avoid confusion. 3GPP EPC 324 may maintain IP connectivity by attaching to SGW 325 while maintaining the initial IP prefix (IP-1). The initial IP prefix (IP-1) may be maintained by either relocating the IP prefix to PGW 327 of 3GPP EPC 329 using DMM (referred to herein as case A which may be referred to as maintaining connectivity through DMM) or by establishing a tunnel to PGW 322 of 3GPP EPC 324 (referred to herein as case B which may be referred to as maintaining connectivity through tunneling). The term PGW 327 is used herein, although it should be understood that the PGW 327 element can comprise any PDN interface.

Both PGW 322 and MME 330 may be aware that the connection to a PDN 340 through the currently used PDN interface (i.e., PGW 322) is more costly (i.e., more distant in network terms from UE 314). As an illustrative example, PGW 322 determines that SGW 325 is in another IP subnet through configuration information, autonomous system (AS) information, and the like. MME 330 may similarly know through PDN connection setup that PGW 322 is distant from UE 314. Either of these entities (PGW 322 and/or MME 330) may be capable of informing UE 314 regarding connection cost or router distance. It is noted that 3GPP EPC 329 also includes a MME 332 and that while MME 330 and MME 332 may be implemented in a disjoint manner, they may be operatively coupled together and share common information and state.

When UE 314 receives information regarding connection cost or router distance and when it is ready to transfer the PDN connection(s) to a more optimal router (i.e., PGW 327), UE 314 may trigger a process to rehome the PDN connection(s) and bearers for an access point name (APN). Several different rehoming processes are possible, as is shown in FIG. 3.

Figure 4:
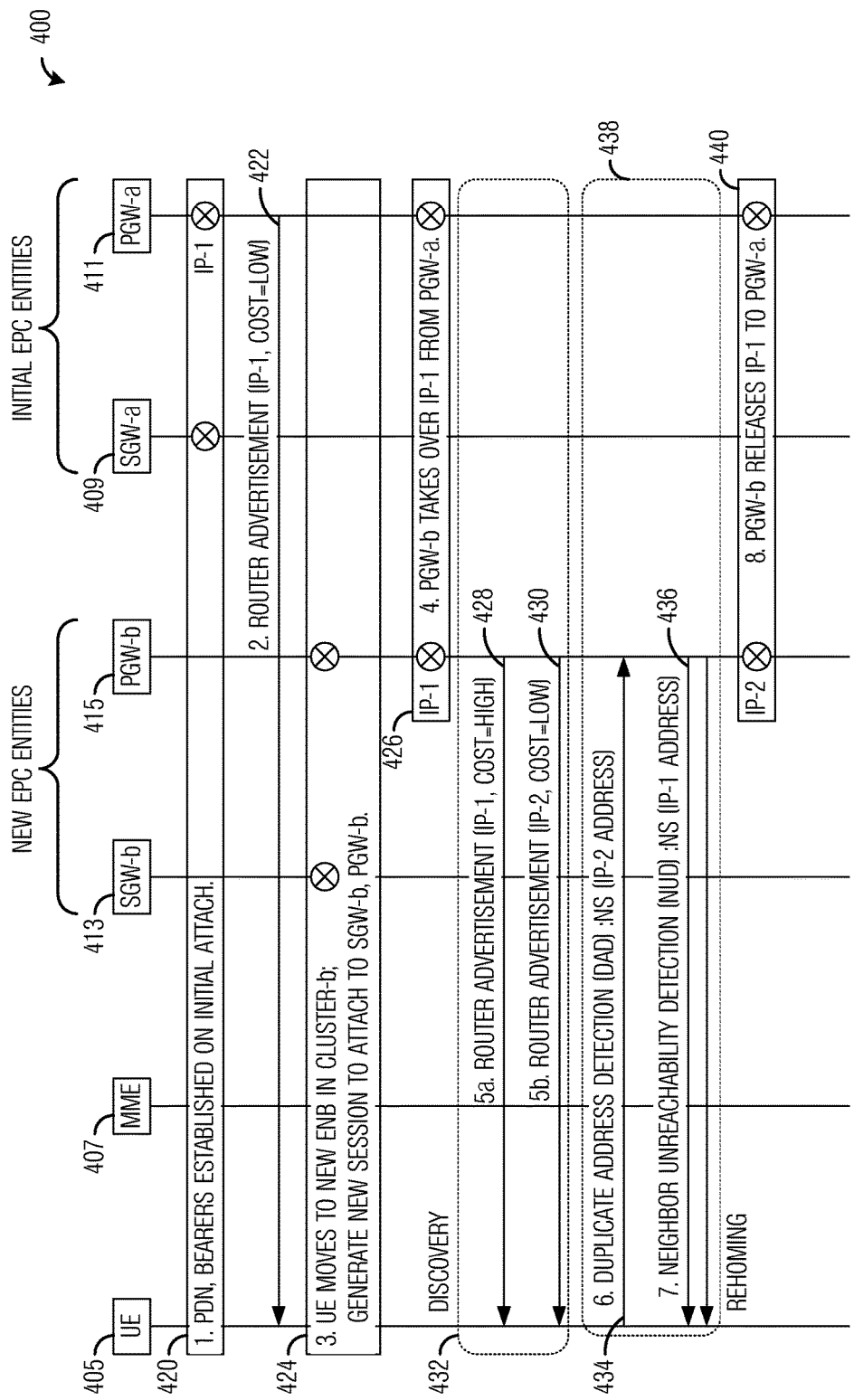
FIG. 4 illustrates an example message exchange and processing diagram highlighting case A with dynamic mobility management (DMM) based PDN rehoming in 3GPP compliant networks according to example embodiments described herein.

FIG. 4 illustrates an example message exchange and processing diagram 400 highlighting case A with dynamic mobility management (DMM) based PDN rehoming in 3GPP compliant networks. Diagram 400 includes messages exchanged and processing occurring in a UE 405, a MME 407, a first SGW ("SGW-a") 409, a first PGW ("PGW-a") 411, a second SGW ("SGW-b") 413, and a second PGW ("PGW-b") 415. Diagram 400 refers to case A as shown in FIG. 3.

UE 405 attaches to an eNB, e.g., eNB-a, in cluster A and MME 407 may assign it to be served by first SGW 409 and first PGW 411 (shown as block 420). MME 407 may select first PGW 411 and initiate signaling to setup PDN connection(s). UE 405 may obtain an IP prefix from first PGW 411 (e.g., IP-1), such as by using IPv6 stateless autoconfig or DHCP, for example. As part of obtaining the IP prefix, UE 405 may receive a router advertisement from first PGW 411 including IP-1 and an associated measure of cost for IP-1, low (shown as event 422).

As UE 405 moves, it may participate in a mobility event, e.g., move from eNB-a to an eNB, e.g., eNB-b in cluster B (shown as block 424). As part of the mobility event, MME 407 changes the SGW serving UE 405 from first SGW 409 to second SGW 413. MME 407 may also select second PGW 415 to replace first PGW 411. MME 407 may also generate a new session, as well as indicate to second PGW 415 to obtain IP-1 from first PGW 411. It is noted that the indication (the indication for second PGW 415 to obtain IP-1 from first PGW 411) is a new indication.

Second PGW 415 may acquire IP-1 from first PGW 411 and set up S5 bearer sessions (shown as block 426). MME 407 may complete signaling to establish and link S1 and radio bearers. Second PGW 415 may advertise to other routers that it owns IP-1. First PGW 411 may exclude IP-1 from its advertisements (e.g., border gateway protocol (BGP)).

Second PGW 415 may send a first router advertisement for IP-1 with associated measure of cost to high (shown as event 428), and a second router advertisement for IP-2 (an IP prefix within its own IP prefix pool) with associated measure of cost to low (shown as event 430). The sending of the router advertisements for IP-1 and IP-2 may constitute a discovery process for UE 405 (event 432), where it discovers available IP prefixes and costs associated therewith.

UE 405 may evaluate the information received during discovery process 432. UE 405 may determine to continue using its current IP prefix. Alternatively, UE 405 may determine to transition to new, low cost IP prefix. When UE 405 determines that it is to transition to the new, low cost IP prefix, it may generate an address associated with the IP-2 IP prefix and send a neighbor solicitation (NS) duplicate address detection (DAD) message with the address associated with the IP-2 IP prefix (shown as event 434). In other words, UE 405 is checking to determine if it is using a duplicate address (the address associated with the IP-2 IP prefix). If the address is not a duplicate, which UE 405 may be able to determine if it does not receive a DAD response message within a specified time duration, UE 405 may use the address associated with the IP-2 IP prefix. Second PGW 415 may interpret the use of the address associated with the IP-2 IP prefix by UE 405 as a trigger for it to send one or more neighbor unreachability detection messages (NUDs) for IP-1 IP prefix (shown as event 436). Collectively, events 434 and 436 may be referred to as the connection rehoming process 438.

Second PGW 415 may release the IP-1 IP prefix to first PGW 411 after transmitting the NUDs in event 436 and determining that the IP-1 IP prefix is not in use (shown as event 440). With the release of the IP-1 IP prefix, second PGW 415 may no longer advertise IP-1, while first PGW 411 may resume advertising IP-1 since it has been released. The PDN connection and the IP prefix for UE 405 have been rehomed.

Figure 5:
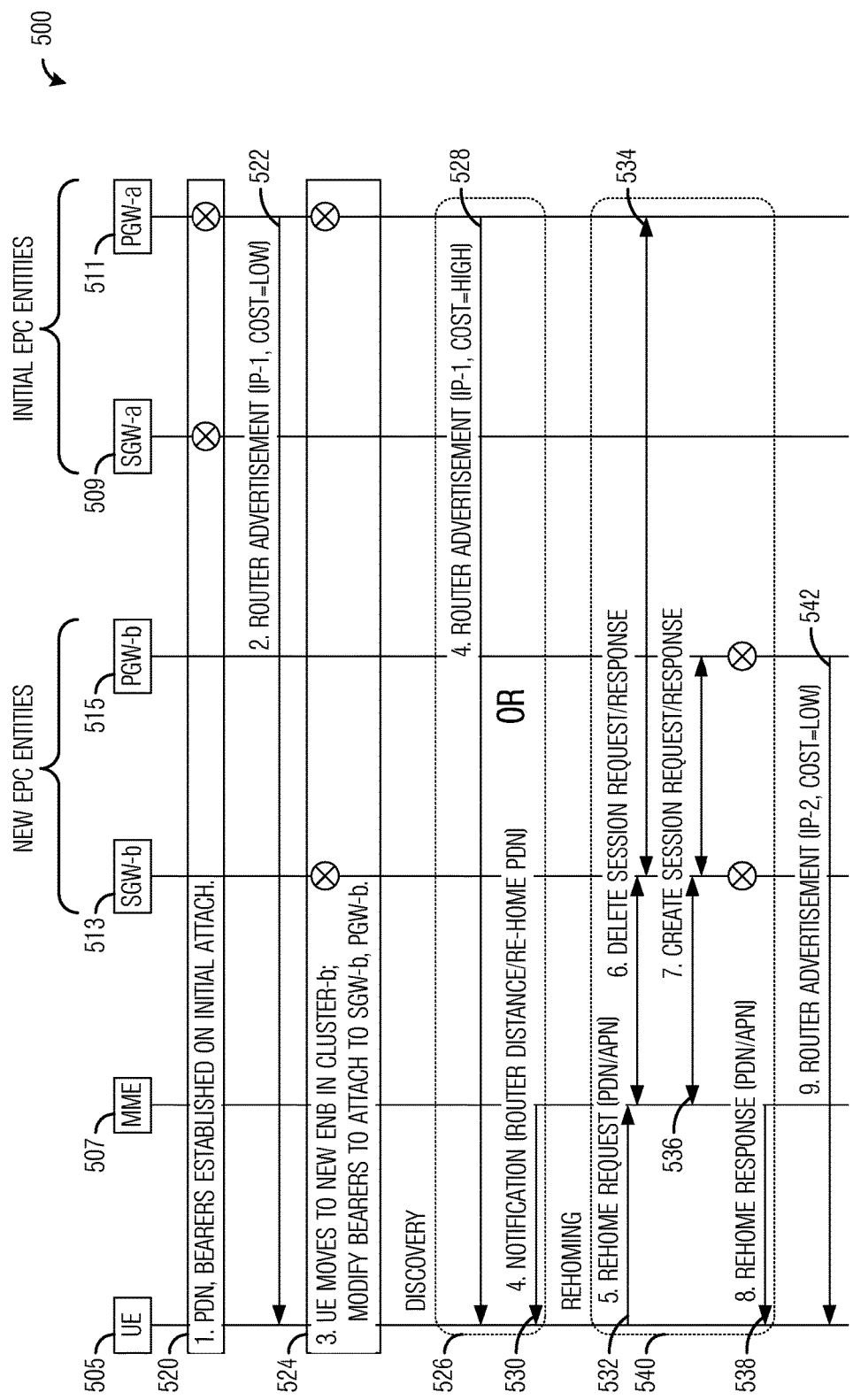
FIG. 5 illustrates an example message exchange and processing diagram highlighting case B with MME based PDN rehoming in 3GPP compliant networks according to example embodiments described herein.

FIG. 5 illustrates an example message exchange and processing diagram 500 highlighting case B with MME based PDN rehoming in 3GPP compliant networks. Diagram 500 includes messages exchanged and processing occurring in a UE 505, a MME 507, a first SGW ("SGW-a") 509, a first PGW ("PGW-a") 511, a second SGW ("SGW-b") 513, and a second PGW ("PGW-b") 515.

UE 505 attaches to an eNB, e.g., eNB-a, in cluster A and MME 507 may assign it to be served by first SGW 509 and first PGW 511 (shown as block 520). MME 507 may select first PGW 511 and initiate signaling to setup PDN connection(s). UE 505 may obtain an IP prefix from first PGW 511 (e.g., IP-1), such as by using IPv6 stateless autoconfig or DHCP, for example. As part of obtaining the IP prefix, UE 505 may receive a router advertisement from first PGW 511 including IP-1 and an associated measure of cost for IP-1, low (shown as event 522).

As UE 505 moves, it may participate in a mobility event, e.g., move from eNB-a to an eNB, e.g., eNB-b in cluster B (shown as block 524). As part of the mobility event, MME 507 changes the SGW serving UE 505 from first SGW 509 to second SGW 513, but first PGW 511 is retained so that IP session continuity is maintained.

UE 505 may participate in a discovery process 526 to determine costs associated with packet routing. Discovery process 526 may include a router cost metric provided by first PGW 511 in a router advertisement with IP-1 and a measure of cost for IP-1 (shown as event 528). The measure of cost may serve as an indication to UE 505 of costs of the current connection. UE 505 may use the measure of cost to determine if it should rehome the current connection. Alternatively, discovery process 526 may include information provided by MME 507. MME 507 may send a notification message to UE 505, where the notification message includes an indication of cost for the current connection and/or advice for UE 505 to rehome the current connection (shown as event 530). Discovery process 526 may include one or both of the alternatives.

UE 505 may send to MME 507 a rehome request message (shown as event 532) with PDN and/or access point name (APN) information. Alternatively, an attach request message may be sent with a parameter indicating a rehome mode, e.g., parameter: "mode=rehome". MME 507 may send a delete session request to delete the current connection and bearer resources at first PGW 511 and second SGW 513 (shown as event 534). MME 507 may send a create session request to create a PDN connection and bearer resources to second PGW 515 and second SGW 513 (shown as event 536). MME 507 may link the new PDN connection to existing radio access bearers at eNB-b, as well as send a rehome response message to UE 505 (shown as event 538). Collectively, events 532-538 may be referred to as connection rehoming process 540. The PDN connection and IP prefix of UE 505 have been rehomed. Second PGW 515 may send a router advertisement to UE 505 for IP-2 with the measure of cost set to low (shown as event 542).

With respect to mobility in trusted non-3GPP (N3GPP) compliant networks, 3GPP uses bearers and PDN connections (Layer 2 constructs) over which IP services are transported. Each UE may have multiple PDN connections. Extensions are used to provide fully optimal selection of gateways or routers.

Figure 6:
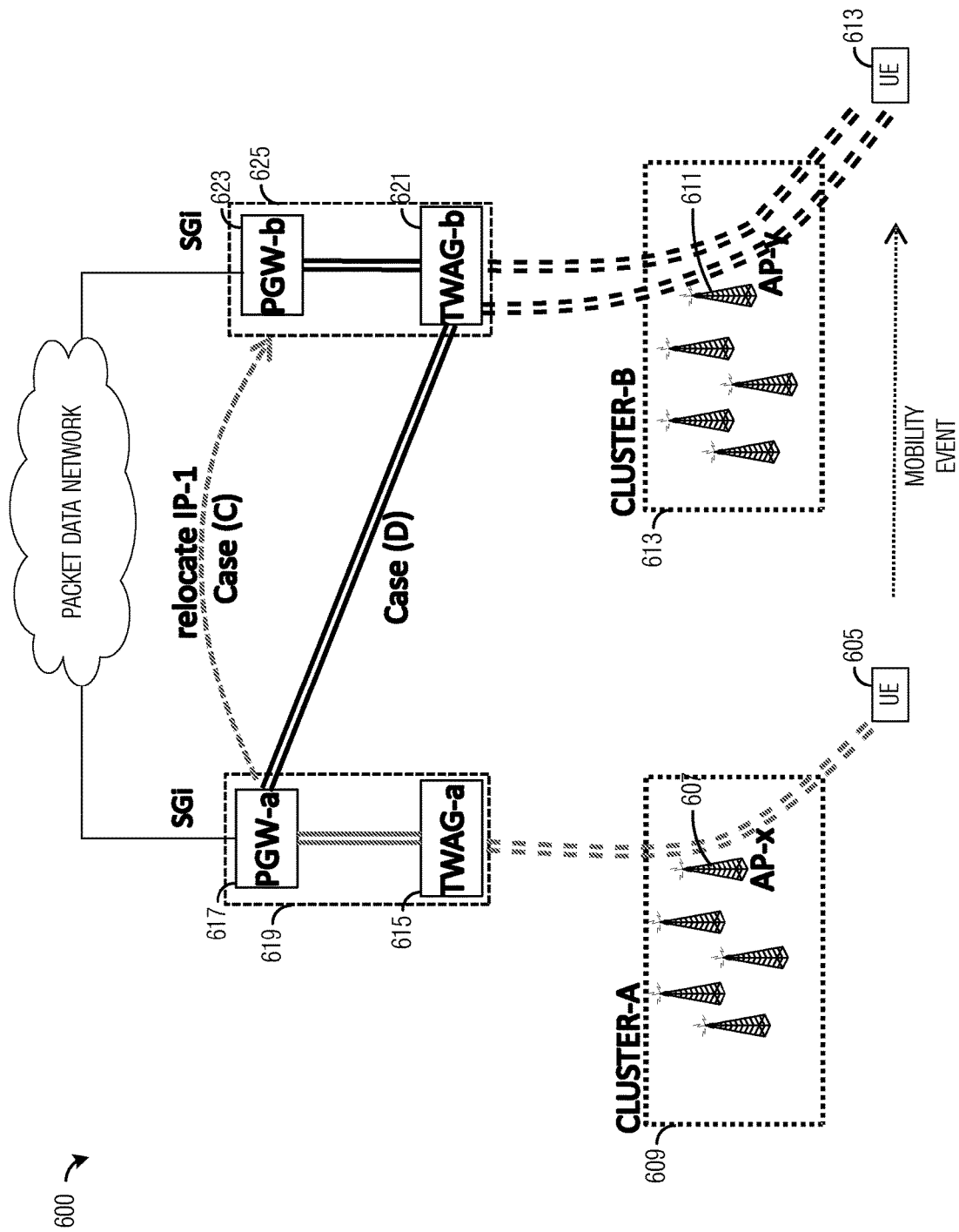
FIG. 6 illustrates an example communications system providing a high-level view of PDN connections of a UE before and after rehoming in trusted non-3GPP (N3GPP) networks according to example embodiments described herein.

FIG. 6 illustrates an example communications system 600 providing a high-level view of PDN connections of a UE before and after rehoming in trusted N3GPP networks. The trusted N3GPP networks shown in FIG. 6 are IEEE 802.11 WiFi networks, but other trusted N3GPP networks may operate in a similar manner. As shown in FIG. 6, a UE 605 may be initially attached to AP-x 607 in cluster A 609. UE 605 may be attached to a first TWAG (TWAG-a) 615 and first PGW (PGW-a) 617 of 3GPP EPC 619. The term PGW-a 617 is used herein, although it should be understood that the PGW-a 617 element can comprise any PDN interface. As UE 605 moves, it participates in a mobility event and attaches to AP-y 611 in cluster B 613, where it is relabeled UE 613 to avoid confusion. As UE 613 becomes attached to AP-y 611, 3GPP EPC 619 maintains IP session continuity by attaching to second TWAG (TWAG-b) 621 while maintaining IP anchor at first PGW 617 and retaining the initially assigned IP prefix, IP-1. The initially assigned IP prefix may be maintained by relocating the IP prefix to second PGW 623 using DMM (shown as case C which may be referred to as maintaining connectivity through DMM) or by managing a tunnel(s) between first PGW 617 and second TWAG 621 (shown as case D which may be referred to as maintaining connectivity through tunneling). The term PGW 623 is used herein, although it should be understood that the PGW 623 element can comprise any PDN interface. First PGW 617 may be aware that routing packets to and from UE 613 is now more costly (due to increased distance or latency, for example). As an example, first PGW 617 determines that second TWAG 621 is in another IP subnet using configuration information, autonomous system (AS) information, and the like. When UE 613 acquires knowledge of the costs of staying with first PGW 617 and is ready to transfer the PDN connection(s) to a more optimal router (e.g., second PGW 623), UE 613 may trigger a process to rehome the PDN connection(s) and bearers for the APN. Several different rehoming processes are possible, as is shown in FIG. 6.

Figure 7:
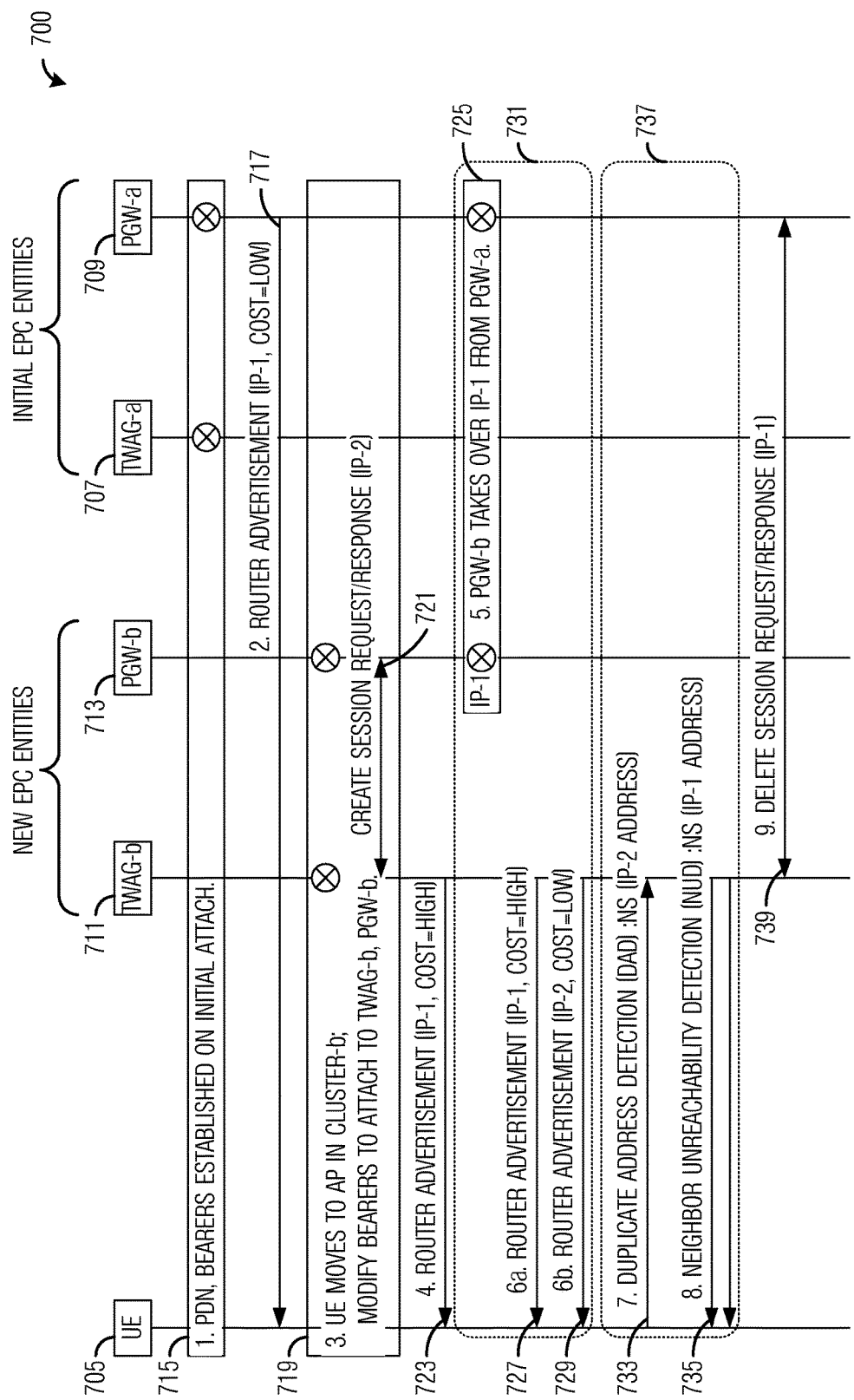
FIG. 7 illustrates an example message exchange and processing diagram highlighting case C with DMM based PDN rehoming in trusted N3GPP networks according to example embodiments described herein.

FIG. 7 illustrates an example message exchange and processing diagram 700 highlighting case C with DMM based PDN rehoming in trusted N3GPP networks. Diagram 700 includes messages exchanged and processing occurring in a UE 705, a first TWAG ("TWAG-a") 707, a first PGW ("PGW-a") 709, a second TWAG ("TWAG-b") 711, and a second PGW ("PGW-b") 713). Diagram 700 refers to case C as shown in FIG. 6.

UE 705 attaches to AP-x in cluster A and first TWAG 707 may set up general packet radio service (GPRS) tunneling protocol (GTP) bearers and/or PDN connection(s) to first PGW 709 (shown as event 715). UE 705 may obtain an initial IP prefix IP-1 from first PGW 709, such as by using IPv6 stateless autoconfig or DHCP, for example. As part of obtaining the IP prefix, UE 705 may receive a router advertisement sent by first PGW 709, the router advertisement including IP-1 and an associated measure of cost for IP-1, low (shown as event 717).

As UE 705 moves, it may participate in a mobility event, e.g., move from AP-x to another AP, e.g., AP-y in cluster B and attaches to second TWAG 711 (shown as block 719). As part of attaching to second TWAG 711, UE 705 may download authorization profiles to second TWAG 711. As an illustrative example, the authorization profiles may include the previous address of UE 705 (IP-1), gateway (first PGW 709), as well as an indication of IP address relocation support. It is noted that the indication of the IP address relocation support may be a new indication.

Since IP address relocation is supported, second TWAG 711 may create a session to second PGW 713 (shown as event 721). Second TWAG 711 may provide to second PGW 713 the IP prefix of UE 705 (IP-1) and/or a gateway address (address of first PGW 709). Second TWAG 711 may alternatively provide a fully qualified domain name (FQDN), which may comprise IP-1 and the address of first PGW 709. Second TWAG 711 may send a router advertisement including IP-1 and a measure of cost set to high (shown as event 723). Second PGW 713 may obtain IP-1 from first PGW 709 using any of a variety of widely known techniques (shown as event 725).

Second TWAG 711 may send a router advertisement including IP-1 and a measure of cost set to high (shown as event 727). Second TWAG 711 may send a router advertisement including IP-2 (an IP prefix from its IP pool) and a measure of cost set to low (shown as event 729). Events 725-729 may be collectively referred to as discovery 731.

When UE 705 is ready to transition to the new, low cost IP prefix (IP-2), UE 705 may generate an address associated with the IP-2 IP prefix and send a NS DAD message with the address associated with IP-2 (shown as event 733). If the address is not a duplicate, which UE 705 may be able to determine if it does not receive a DAD response message within a specified time duration, UE 705 may use the address associated with IP-2 IP. Second TWAG 711 may interpret the use of the address associated with IP-2 by UE 705 as a trigger to send one or more NUD messages with IP-1 (shown as event 735). Events 733-735 may be collectively referred to as the connection rehoming process 737. Second TWAG 711 may release IP-1 and PDN connection segment S5 by sending a delete session request message to first PGW 709 (shown as event 739). Second TWAG 711 may also stop advertising IP-1. The PDN connection and the IP prefix for UE 705 have been rehomed.

Figure 8:
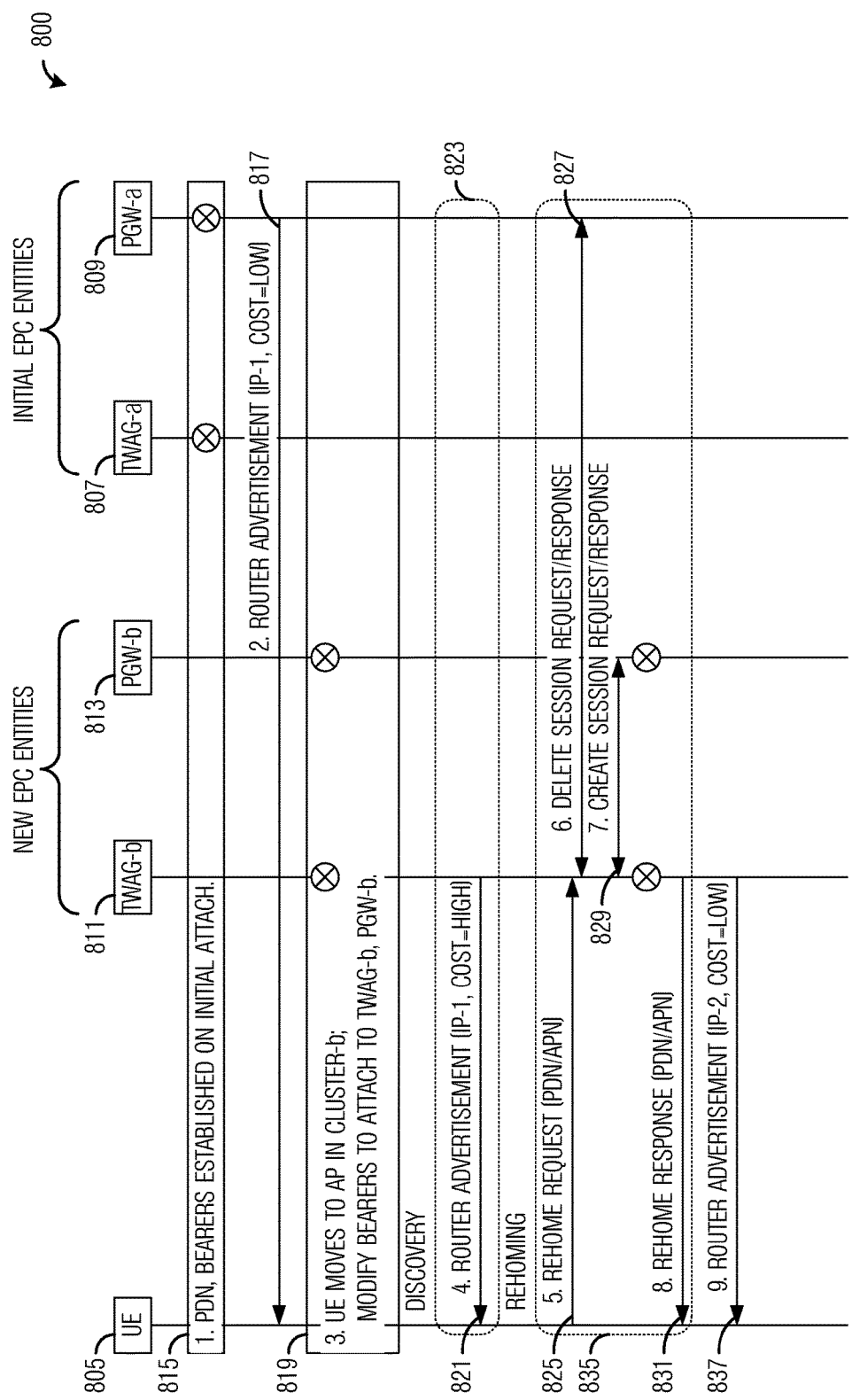
FIG. 8 illustrates an example message exchange and processing diagram highlighting case D with TWAG based PDN rehoming in trusted N3GPP networks according to example embodiments described herein.

FIG. 8 illustrates an example message exchange and processing diagram 800 highlighting case D with TWAG based PDN rehoming in trusted N3GPP networks. Diagram 800 includes messages exchanged and processing occurring in a UE 805, a first TWAG ("TWAG-a") 807, a first PGW ("PGW-a") 809, a second TWAG ("TWAG-b") 811, and a second PGW ("PGW-b") 813). Diagram 800 refers to case D as shown in FIG. 6.

UE 805 attaches to AP-x in cluster A and first TWAG 807 may set up general packet radio service (GPRS) tunneling protocol (GTP) bearers and/or PDN connection(s) to first PGW 809 (shown as event 815). UE 805 may obtain an initial IP prefix IP-1 from first PGW 809, such as by using IPv6 stateless autoconfig or DHCP, for example. As part of obtaining the IP prefix, UE 805 may receive a router advertisement sent by first PGW 809, the router advertisement including IP-1 and an associated measure of cost for IP-1, low (shown as event 817).

As UE 805 moves, it may participate in a mobility event, e.g., move from AP-x to another AP, e.g., AP-y in cluster B and attaches to second TWAG 811 (shown as block 819). Second TWAG 811 may set up PDN connections and/or bearer sessions to first PGW 809 so that IP session continuity is maintained. Second TWAG 811 may send a router advertisement with IP-1 and a measure of cost equal to high (shown as event 821). The router advertisement may serve as an indication to UE 805 that second TWAG 811 may route IP-1 but that the cost for such routing is high. Event 821 may be referred to as discovery 823.

When UE 805 is ready to transition to a new, low cost IP prefix, UE 805 may send a rehome request message to second TWAG 811 (shown as event 825). The rehome request message may be a newly defined message. Second TWAG 811 may send a delete session request message to delete PDN connection(s) and/or bearer(s) at first PGW 809 (shown as event 827). Second TWAG 811 may send a create session request message to establish PDN connection(s) and/or bearer(s) at second PGW 813 (shown as event 829). It is noted that the delete session request and the create session request and attendant response messages may occur sequentially or in parallel with one another. In other words, second TWAG 811 may send the delete session request and the create session request sequentially or in parallel. With the PDN connection(s) and/or bearer(s) established, second TWAG 811 may send a rehome response message to UE 805 (shown as event 831). Events 825-831 may be referred to as the connection rehoming process 835. The PDN connection and the IP prefix for UE 805 have been rehomed. Second TWAG 811 may send a router advertisement with IP-2 and a measure of cost equal to low (shown as event 837). It is noted that the rehomed S5 sessions may be treated as continuations of initial S5 sessions.

Figure 9:
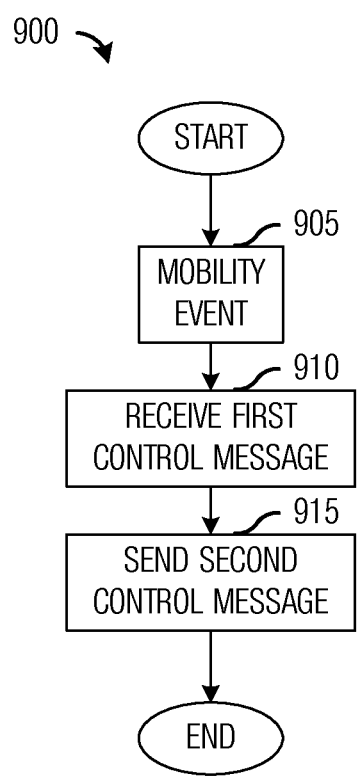
FIG. 9 illustrates a flow diagram of example operations occurring in a network entity participating in connection rehoming according to example embodiments described herein.

FIG. 9 illustrates a flow diagram of example operations 900 occurring in a network entity participating in connection rehoming. Operations 900 may be indicative of operations occurring in a network entity, such as a second PGW (such as second PGW 415), a MME (such as MME 507), a second TWAG (such as second TWAG 711 and 811), and the like, as the network entity participates in connection rehoming.

Operations 900 may begin with the network entity participating in a mobility event (block 905). The network entity may participate in a mobility event where a UE changes from a first SGW to a second SGW or from a first TWAG to a second TWAG, for example. When the UE participates in discovery and when the UE is ready to participate in the connection rehoming, the UE may initiate the connection rehoming by sending a first control message to the network entity (block 910). The first control message may differ depending on the mechanism used for connection rehoming. As an illustrative example, if DMM is used for connection rehoming, the first control message may be a DAD message sent by the UE to the network entity (the second PGW). If MME based connection rehoming is being implemented, the first control message may be a rehome request message sent to the network entity (the MME). In the situation when trusted N3GPP compliant networks are involved in connection rehoming, the first control message may be a DAD message sent to the second TWAG when DMM is used and a rehome request message sent by the UE when TWAG based connection rehoming is used. The network entity may send a second control message to the UE to finalize the connection rehoming (block 915). The second control message may differ depending on the mechanism used for connection rehoming. As an illustrative example, if DMM is used for connection rehoming, the second control message may be a NUD message sent by the network entity to the UE. If MME based connection rehoming is being implemented, the second control message may be a rehome response message sent by the MME to the UE. In the situation when trusted N3GPP compliant networks are involved in connection rehoming the second control message may be a NUD message sent by the second TWAG when DMM is used and a rehome response message sent by the second TWAG when TWAG based connection rehoming is used.

Figure 10:
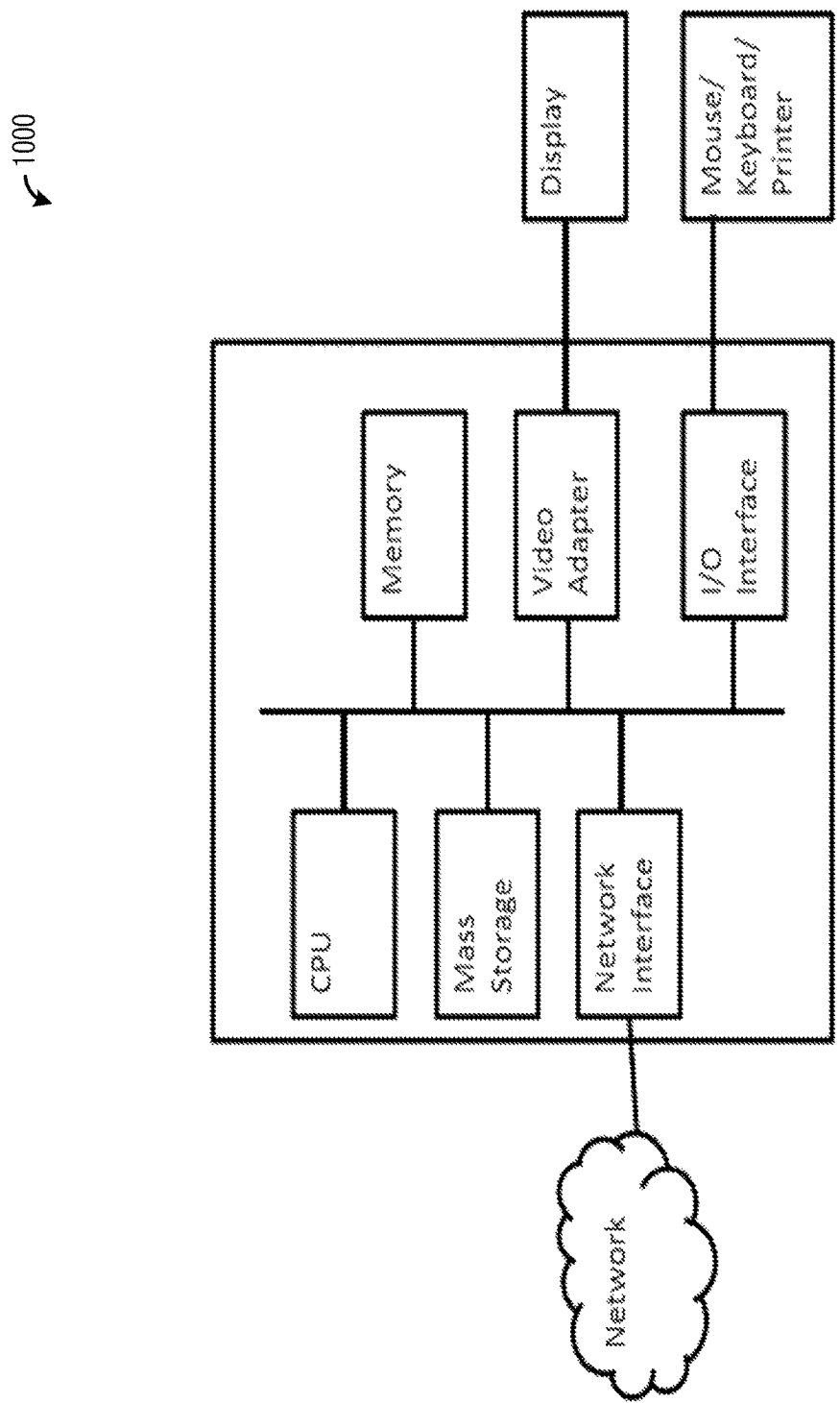
FIG. 10 is a block diagram of a processing system that may be used for implementing the devices and methods disclosed herein.

FIG. 10 is a block diagram of a processing system 1000 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of non-transitory storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the present disclosure and its advantages have been described in detail, it should be understood that various changes, substitutions and alterations can be made herein without departing from the spirit and scope of the disclosure as defined by the appended claims.

What is claimed is:
1. A method for connection rehoming, the method comprising:

attaching, by a user equipment (UE), to a first network attachment point (AP) and establishing a first packet data network (PDN) connection to a first PDN interface in a network core;

moving, by the UE, from the first network AP to a second network AP;

receiving, by the UE, a first router advertisement comprising a first Internet Protocol (IP) prefix associated with the first PDN connection and a first measure of cost associated with the first PDN connection, wherein the first measure of cost is high;

receiving, by the UE, a second router advertisement including a second IP prefix associated with the second network AP and a second measure of cost associated with the second IP prefix, wherein the second measure of cost is lower than the first measure of cost; and sending, based on the first router advertisement, by the UE, a first control message initiating a rehoming of the first PDN connection, thereby establishing a second PDN connection based on the second router advertisement.

2. The method of claim 1, wherein the first router advertisement is received from one of the first network AP and the second network AP.

3. The method of claim 1, wherein the rehoming of the first PDN connection further comprises:
generating an IP address associated with the second IP prefix;
sending a duplicate address detection (DAD) message for the IP address; and
using the second PDN connection with the IP address in response to determining that a DAD response is not received within a specified time duration.

4. The method of claim 3, wherein rehoming the first PDN connection further comprises receiving at least one neighbor unreachability detection (NUD) message for the first IP prefix associated with the first PDN connection.

5. The method of claim 1, wherein rehoming the first PDN connection comprises:
receiving a rehoming response message.

6. The method of claim 5, wherein the first control message is sent to the second network AP or a mobility management entity (MME).

7. A method for connection rehoming, the method comprising:
sending, by a network entity, a first router advertisement comprising a first Internet Protocol (IP) prefix associated with a first packet data network (PDN) connection and a first measure of cost associated with the first PDN connection, wherein the first measure of cost is high;
sending, by the network entity, a second router advertisement comprising a second IP prefix associated with the second network access point (AP) and a second measure of cost associated with the second IP prefix, wherein the second measure of cost is lower than the first measure of cost;
receiving, by the network entity, a first control message initiating a rehoming for the first PDN connection, thereby establishing a second PDN connection based on the second router advertisement.

8. The method of claim 7, wherein the first control message comprises a duplicate address detection (DAD) message for the second IP prefix associated with the second network AP, wherein the second IP prefix identifies the second PDN connection coupling the UE to the second PDN interface in the network core.

9. The method of claim 7, wherein the first control message comprises a rehome request message including information associated with the first PDN connection.

10. The method of claim 9, further comprising:
deleting the first PDN connection; and
generating the second PDN connection coupling the UE to a second network attachment point and to a second router.

11. A user equipment (UE) adapted to perform connection rehoming, the UE comprising:
a memory storage comprising instructions; and
one or more processors in communication with the memory, wherein the one or more processors execute the instructions to:
attach to a first network attachment point (AP) and establish a first packet data network (PDN) connection to a first PDN interface in a network core,
move from the first network AP to a second network AP,
receive a first router advertisement comprising a first Internet Protocol (IP), prefix associated with the first PDN connection and a first measure of cost associated with the first PDN connection, wherein the first measure of cost is high;
receive a second router advertisement including a second IP prefix associated with the second network AP and a second measure of cost associated with the second IP prefix, wherein the second measure of cost is lower than the first measure of cost; and
send, based on the first router advertisement, a first control message initiating a rehoming of the first PDN connection, thereby establishing a second PDN connection based on the second router advertisement.

12. The UE of claim 11, wherein the programming includes instructions to receive the first router advertisement from the first network AP or the second network AP.

13. The UE of claim 11, wherein the programming includes instructions to:
generate an IP address associated with the second IP prefix;
send a duplicate address detection (DAD) message for the IP address; and
use the second PDN connection with the IP address in response to determining that a DAD response is not received within a specified time duration.

14. The UE of claim 11, wherein the programming includes instructions to:
receive a rehoming response message.

15. The UE of claim 14, wherein the programming includes instructions to send the first control message to the second network AP or a mobility management entity (MME).

* * * * *